RAE & MILLER.
Car Wheel.
No. 88,207.
Patented March 23, 1869.
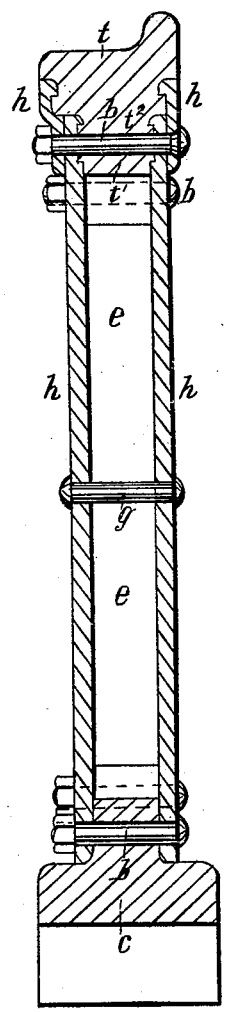

UNITED STATES PATENT OFFICE.

JAMES RAE, OF LONDON, ENGLAND, AND GEORGE MILLER, OF GLASGOW, SCOTLAND.

Letters Patent No. 88,207, dated March 23, 1869.

IMPROVEMENT IN THE CONSTRUCTION OF RAILWAY-WHEELS.

The Schedule referred to in these Letters Patent and making part of the same.

*To all whom it may concern:*

Be it known that we, JAMES RAE, of London, England, and GEORGE MILLER, of Glasgow, Scotland, have invented certain new and useful "Improvements in the Construction of Railway-Wheels;" and we do hereby declare that the following is a full and exact description of the same, reference being had to the accompanying sheet of drawings, forming a part of this specification.

The said invention relates to wheels for railway-purposes, constructed with the tire and body in separate portions and of different materials; and consists chiefly in a novel method of securing the tire, or tread to the body of the wheel, whereby such wheels are rendered more safe, strong, and durable than has hitherto been practicable, while their construction is greatly simplified.

The body of our improved wheel is made separate from the boss, of two circular plates of metal, which may be either of cast or wrought-iron. We unite the tire to said plates by tongue-and-groove joints and auxiliary hook-rings extending around the wheel. These tongue-and-groove joints are formed by making projections on the flange of the tire, to fit grooves cut in the plates, or *vice versa*, and auxiliary hook-rings are formed with tongues, or lips, to fit grooves or recesses, both in the tire and plates. These tongue-and-groove joints hold the tire to the wheel in such a manner, that the bolts which pass through the flange of the tire, as well as the plates, are relieved of all shearing or other injurious strain, and have only to keep the parts of the wheel from being displaced laterally. When a wheel is constructed according to our improvements, even if its tire should be broken, the tongues, or projections remain in their grooves, or recesses, and therefore no part of the tire will fly off, or come away from the wheel.

When the tire is made of cast or malleable cast-iron, we chill the face and guiding-surface, in the process of casting, the other parts of the said tire being properly tempered, to allow of its being turned, bored, and fitted. When all the parts of the wheel have been properly fitted together, we secure them by cramps or other device, and drill, bolt, or rivet holes through all of such parts at one operation. The bolts or rivets are then inserted, and the parts are thereby firmly and solidly united. We then fix a pair of wheels on their axle, and hang the same between centres, for the purpose of grinding the chilled working or bearing-surfaces of the tire, to render them true. This grinding is effected by means of a lap-stone, revolving in an opposite direction to the wheel, or by other suitable means.

*Description of the Drawings.*

Figures 1 and 2 are sections of our improved wheels, as we prefer to construct them for locomotives.

Figure 3 shows half of one side of fig. 2.

Figures 4 and 5 are a similar section and side view of a carriage-wheel, constructed according to our improvements.

Figures 6 and 7 illustrate modifications of our improved wheels.

Like letters indicate the same parts throughout the drawings.

In the wheels illustrated in figs. 1, 2, 3, 6, and 7, which are all more especially designed for railway-engines, the tire $t$ is preferably made of cast-iron, and connected to the central portion, or boss, $c$ by the wrought-iron disks, or plates $p$. The said boss may be formed of malleable cast-iron, or other suitable metal.

The flanges $t^1$, on the tire $t$, are formed with circular projections $t^2$, which fit circular grooves, or channels in the disks, or plates $p$, which, in this case, form the body of the wheel.

In the wheel shown in fig. 1, the tire $t$ and plates $p$, which, as in the other figures, are united together with tongue-and-groove joints, are further secured by the hook-rings $h$.

The said rings and plates are held securely and closely together by means of one or more rows of bolts, or rivets $b$, an intermediate row of similar bolts, or rivets $g$, being used to prevent the springing of the plates.

The disks $p$, which are made of wrought-iron, toughened cast-iron, steel, or other suitable metal, are fitted tightly upon the boss $c$, and thereby prevent the splitting of the said boss when it is being keyed upon its axle. The bolts, or rivets for securing the plates $p$ to the boss $c$, may be arranged in either one or two rows, as desired.

The space $e$, in these wheels, between the plates $p$, may be filled with wood, to form an elastic cushion, or with cement or other heavy material, to add to the weight of the wheel.

The plates $p$ may be placed upon the wheel parallel to each other, as in figs. 1, 2, 4 and 7, or inclined, or conical, as in fig. 6.

This conical, or dishing form, is given to the said plates in the following manner:

Each plate, after being properly heated, is placed between two cast-iron moulds, of the required form. The said moulds are then pressed together by hydraulic or other power, and thereby impart to the plate the desired form, or shape.

In the wheel illustrated in figs. 4 and 5, which is more especially adapted for carriages, it will be seen that the mode of uniting the tire to the body is substantially the same as in figs. 2, 3, and 7. The said tire may be constructed of cast-iron, wrought-iron, or steel.

Hook-rings $h$, as in fig. 1, may also be employed, if desired, but these are not necessary for carriage-wheels constructed as shown.

In this wheel, we also prefer to fill the space $e$, between the disks, or plates $p$, with wood, to form a cushion for the tire $t$, and thus render the wheel more elastic.

We are aware of the improved wheel for which Letters Patent were granted in England to Daniel Evans, February 21, 1861, and that the wheel described by us, is, in many respects, substantially identical therewith, and we therefore limit our claim to that which we believe to be an improvement of said Evans's wheel; that is to say—

We claim, and desire to secure by Letters Patent—

The combination of the hook-rings $h\ h$ with the tire $t$ and disks $p\ p$, as shown and described.

JAMES RAE. [L. S.]
GEORGE MILLER. [L. S.]

Witnesses to the signature of JAMES RAE:
M. WYNN, 24 *Royal Exchange*.
THOS. W. PALMER.

Witnesses to the signature of GEORGE MILLER:
JOSEPH CAIRNEY,
ROBERT BURGESS.